United States Patent

[11] 3,630,618

| [72] | Inventor | Carroll G. Jacoby<br>6018 S.E. 42nd Ave., Portland, Oreg. 97206 |
|---|---|---|
| [21] | Appl. No. | 884,277 |
| [22] | Filed | Dec. 11, 1969 |
| [45] | Patented | Dec. 28, 1971 |

[54] BEARING INSPECTION INSTRUMENT
3 Claims, 3 Drawing Figs.

[52] U.S. Cl. .................................................. 356/72,
356/120, 356/237, 356/241, 356/244
[51] Int. Cl. ...................................................... G01n 21/00,
G01n 21/16, G01n 21/32
[50] Field of Search .......................................... 356/72,
120, 156–158, 167, 237, 241, 244; 250/227, 228

[56] References Cited
UNITED STATES PATENTS

| 2,406,166 | 8/1946 | Scott | 356/244 X |
| 2,533,747 | 12/1950 | Thienemann | 356/244 X |
| 2,823,301 | 2/1958 | Stevens | 356/237 X |
| 3,019,708 | 2/1962 | French, Jr. et al. | 356/244 |
| 3,027,804 | 4/1962 | Wesley et al. | 356/244 |
| 3,330,963 | 7/1967 | O'Connor | 250/227 |
| 3,432,243 | 3/1969 | Hardesty | 250/228 X |
| 3,484,150 | 12/1969 | Taoka et al. | 356/237 X |

FOREIGN PATENTS

| 919,984 | 2/1963 | Great Britain | 356/237 |

Primary Examiner—Ronald L. Wibert
Assistant Examiner—Warren A. Sklar
Attorney—Kolisch & Hartwell ABSTRACT: A viewing instrument for inspecting ring or bearing surfaces. A shield plate having a light aperture therein separates a ring or bearing mount on the front of the instrument housing from a light source contained within the housing. A viewing lens is provided on the housing adapted to be positioned over the bearing mount. The light source, apertured shield and viewing lens are all individually movable with respect to the bearing mount so that the surface of a ring or bearing raceway may be illuminated and viewed under ideal conditions to identify blemishes thereon.

PATENTED DEC 28 1971

3,630,618

Carroll G. Jacoby
INVENTOR
BY Kolisch & Hartwell
Attys.

BEARING INSPECTION INSTRUMENT

BACKGROUND OF THE INVENTION

The present invention concerns a novel instrument for inspecting surfaces of rings or bearing raceways. More particularly, the invention concerns an instrument for illuminating the surface of a bearing raceway with light from a preferred angle, and for permitting the surface to be inspected through a lens oriented at a suitable viewing angle.

In equipment repair it is necessary to inspect roller and ball bearing assemblies for wear to determine whether they should be replaced. Wear in such an assembly usually occurs in the form of pits, blemishes, and chatter marks on the surfaces of the inner raceway of the assembly.

Instruments have been designed in the past to facilitate inspection of rings or raceways, particularly before their assembly into bearings. For example, U.S. Pat. No. 2,529,360 to Welch describes such an instrument. However, such instruments have not been completely satisfactory when utilized for inspecting used bearings and are not widely used in repair shops. Consequently, the usual inspection of a used bearing is manually accomplished, by the mechanic merely holding the bearing in front of a light source and rotating it until light is reflected off the raceway surfaces and any blemishes visible to the naked eye are detected. Such a method is unsatisfactory in many instances since the inner and outer raceways of bearings are closely spaced, and light shining through the bearing assembly is partially obstructed by the rollers. Furthermore, the method is undesirable for repair shop practice since it is tedious, time consuming and nonuniform.

SUMMARY OF THE INVENTION

Accordingly, it is an object of the invention to provide an instrument for viewing the raceway surfaces of a bearing assembly to determine accurately whether pits or blemishes are present.

It is a further object of the invention to provide a bearing inspection instrument having a movable light source for illuminating the bearing raceways with light from a preferred angle.

It is yet a further object of the invention to provide a bearing inspection instrument having adjustable viewing means through which bearing raceway surfaces may be inspected from a suitable viewing angle.

These and other objects of the invention are accomplished by a novel instrument including a housing having a bearing mount secured on a front side thereof. A shield plate having a light aperture therein separates the bearing mount from a light source contained within the housing. A viewing lens is provided on the housing, adapted to be located over a bearing suspended on the bearing mount. The light source, apertured shield and viewing lens are all individually movable with respect to the bearing mount whereby the raceways of a bearing may be illuminated and viewed under ideal conditions to identify blemishes.

BRIEF DESCRIPTION OF THE DRAWINGS

Other features and advantages of the invention will become apparent from the following detailed description, taken in conjunction with the accompanying drawings, wherein.

DETAILED DESCRIPTION OF THE DRAWINGS

Figure 1:
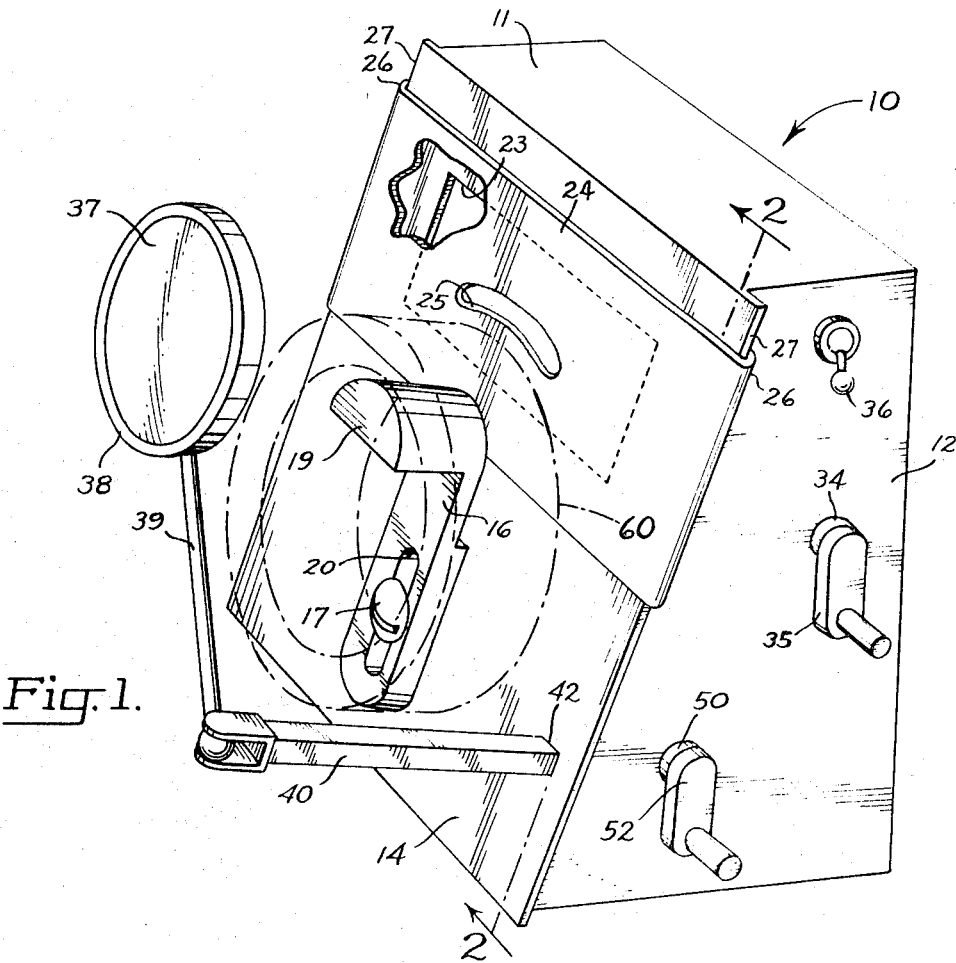
FIG. 1 is a perspective view of the instrument.
Figure 2:
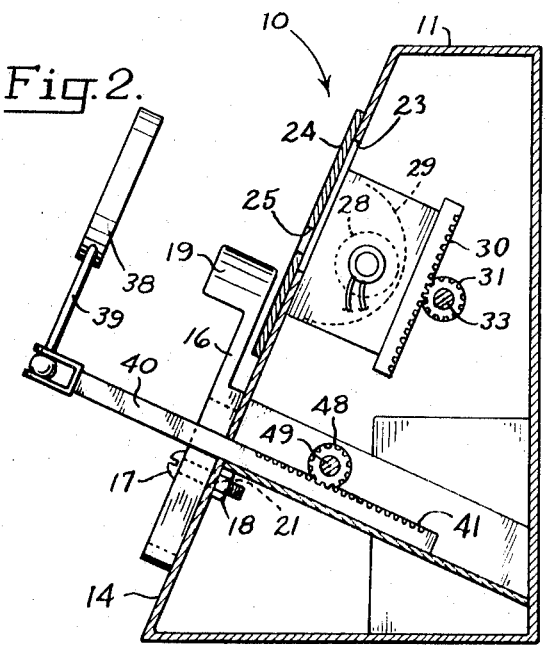
FIG. 2 is a sectional, right elevation view of the instrument.

Referring now to the drawings the bearing inspection instrument includes a housing 10 having a top 11, sides 12 and an angularly inclined front wall 14. A vertically movable bearing mount 16 is secured to wall 14 by means of a screw member 17 and nut 18. Member 17 extends freely through a slot 20 in the mount, and is received in a hole 21 in the front wall. The bearing mount includes an arcuate forward projection 19 at its upper end adapted to receive and support the inner surface of a bearing assembly to be inspected, as shown in dotted outline in FIG. 1.

A rectangular window 23 is formed in wall 14 above the bearing mount and a shield plate 24 having an elongate aperture 23 therein is mounted over the opening. The ends 26 of shield 24 are suitably rolled to engage corresponding flanges 27 on wall 14 whereby the shield is vertically movable with respect to window 23.

A light source 28 preferably comprising a two-level incandescent lamp is confined within the housing immediately behind shield 24; being surrounded by a conical reflector 29.

The light source and reflector are secured to a rack member 30 adapted to be vertically movable under the influence of pinion 31. Pinion 31 is secured to one end of a shaft 33, which is rotatably supported by a bearing 34 mounted in wall 12. A crank 35 is secured to the other end of shaft 33 for adjusting the vertical position of the light source and reflector with respect to the bearing mount. A suitable power source, such as a battery, not shown, provides energization for the light source, which may be set to a low illumination level or a high illumination level by means of a switch 36 located on wall 12.

A viewing lens 37 is provided on the front of the instrument, being secured in a ringlike lens frame 38. The lens frame further comprises an arm 39 which is supported by the outer end of an elongate member 40 which extends through an opening 42 in wall 14. The lens frame is preferably fastened to member 40 by a universal joint which accommodates relative universal movement of the lens relative to member 40. The inner end of member 40 is joined to a rack 41, which is adapted to slide within a channel formed between an angle bracket 45 and the inner surface of the housing.

Rack 41 is engaged by a corresponding pinion 48 secured to the end of a shaft 49 passing through a bearing 50 formed integral with the side of the housing. A crank 52 is secured to the outer end of shaft 49.

Lens 37 is preferably of low magnification, though it may be replaced by a higher power lens as needed for viewing particular surfaces. The lens frame may be moved relative to member 40 to facilitate the insertion and removal of a bearing assembly from mount 16. The lens may be focused by turning crank 52.

Figure 3:
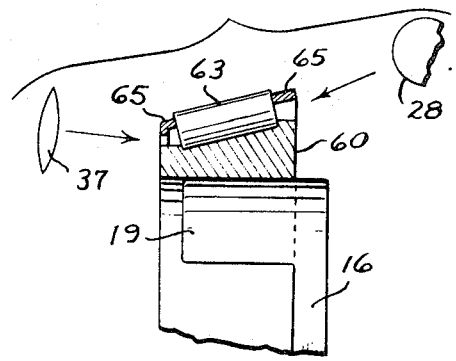
FIG. 3 is an enlarged fragmentary view of a bearing assembly showing the desired illumination angle and viewing angle attained by the instrument of the invention.

Referring now to FIG. 3, a fragmentary view of a typical roller bearing assembly is shown comprising an inner race 60 having an inclined surface 61 thereon which it is desired to inspect. Rollers such as roller 63 are supported in contact with the inner surface by means of conventional holders 65. As shown, light is directed upon surface 61 from the left side of the figure, and this surface is viewed from an angular position indicated by an arrow at the right side of the figure.

To operate the instrument a bearing assembly is placed on mount 16 and lens 37 is oriented over the bearing surface to be inspected. Lamp 28 and shield 24 are then adjusted to appropriate elevations to deliver light at a suitable angle to the surface to be viewed as estimated through experience. The lamp is then switched on to a suitable intensity. Lens 37 is focused, and mover vertically with respect to the mount until the viewer is able to view the inspection surface from the angle which best displays any imperfections thereon.

It has been found that use of the instrument in the manner described results in significantly better detection of blemishes and imperfections on the surfaces of bearing raceways.

It is claimed and desired to secure by Letters Patent:

1. A visual inspection instrument comprising
an instrument housing including a front face having an illumination opening formed therein,
a shield plate having an elongate aperture formed therein, said shield plate including means movably securing said plate to said front face over said illumination opening for relative movement of said aperture with respect to said illumination opening, said shield plate blocking said illumination opening except at the location of said aperture, a light source mounted within said housing spaced from said opening for shining light through said aperture, means mounted on said housing connected to said light source for moving said light source with respect to said opening, an elongate bar having a forward projection joined thereto for supporting an article to be inspected, means on said housing movably mounting said bar on said front face with said projection oriented for relative movement with respect to said opening in a plane spaced forwardly of said front face, an elongate arm having a socket at an outer end thereof, a frame having a viewing lens secured to one end thereof and a ball member secured to another end, said ball member being received within and universally supported by said socket, means suspending said arm and frame from said housing with said lens spaced from said front face for viewing an article supported upon said projection, and means mounted on said housing connected to said arm for moving the arm to focus said lens.

2. Apparatus for inspecting a raceway in a bearing comprising a housing including an opening, a support mounted on said housing adjacent said opening for supporting a bearing with a raceway therein to be inspected exposed, adjustable illumination means mounted for movement on said housing and disposed to one side of said support, operable to direct light through the opening in the housing toward the support to illuminate a raceway in a bearing supported on the support, said illumination means including a light source, and a shield having an aperture positioned between said source and said support, said light source and said shield each being mounted for movement on the housing, with said light source under all circumstances being movable on the housing independently of said shield, and said shield under all circumstances being movable on the housing independently of said light source, said light source and shield each being thus independently adjustable to different positions to change the angle at which light from said source strikes such a raceway, with light from the source shining through said aperture, and adjustable viewing means mounted for movement on said housing and disposed on the opposite side of said support from said shield, adjustable to different positions to enable viewing of light from said source reflected at different angles from such a raceway.

3. A visual inspection instrument comprising a housing with an opening therein on one side thereof, an article support mounted on the outside of said housing for movement adjacent said opening, said support being adapted to support an article which is to be inspected, a shield mounted for movement on said housing to different positions adjacent and extending over said opening, said shield including an aperture partially exposing said opening, a light source mounted for movement on and inside said housing for illuminating at different angles through said aperture a portion of an article supported on said support, said light source under all circumstances being movable on the housing independently of said shield, and said shield under all circumstances being movable on the housing independently of said light source, a viewing lens, and means movably mounting said lens on the outside of said housing for adjustment of the lens to different positions outwardly of said support to accommodate viewing of light from said source reflected at different angles from an article on the support.

* * * * *